US010646818B2

(12) United States Patent
Cruz et al.

(10) Patent No.: US 10,646,818 B2
(45) Date of Patent: May 12, 2020

(54) METHOD AND APPARATUS FOR RECOVERING ABSORBING AGENTS IN ACID GAS TREATMENT

(71) Applicant: Ineos Americas, LLC, Mobile, AL (US)

(72) Inventors: Ulises I. Cruz, Pearland, TX (US); Erik J. Stewart, Pearland, TX (US); Rodrigo Zamora, Houston, TX (US)

(73) Assignee: INEOS Americas, LLC, Mobile, AL (US)

( * ) Notice: Subject to any disclaimer, the term of this patent is extended or adjusted under 35 U.S.C. 154(b) by 111 days.

(21) Appl. No.: 15/641,980

(22) Filed: Jul. 5, 2017

(65) Prior Publication Data

US 2018/0015409 A1 Jan. 18, 2018

Related U.S. Application Data

(60) Provisional application No. 62/365,666, filed on Jul. 22, 2016, provisional application No. 62/358,397, filed on Jul. 5, 2016.

(51) Int. Cl.
*B01D 53/14* (2006.01)
*B01D 53/18* (2006.01)
(Continued)

(52) U.S. Cl.
CPC ..... *B01D 53/1425* (2013.01); *B01D 53/1456* (2013.01); *B01D 53/1493* (2013.01);
(Continued)

(58) Field of Classification Search
None
See application file for complete search history.

(56) References Cited

U.S. PATENT DOCUMENTS 1,783,901 A 10/1930 Bottoms
3,594,985 A 7/1971 Ameen
(Continued)

FOREIGN PATENT DOCUMENTS

EP 3097970 A1 11/2016
RU 2381823 2/2010
(Continued)

OTHER PUBLICATIONS

Attari et al., "Sampling and analysis of natural gas trace constituents." Inst. of Gas Tech., Chicago, IL (1993).*
(Continued)

*Primary Examiner* — Daniel Berns
(74) *Attorney, Agent, or Firm* — Roy Kiesel Ford Doody & North, APLC; Brett A. North

(57) ABSTRACT

A method and apparatus for continuously treating acid gases including recovering absorbent chemicals by introducing streams leaving a regenerator and/or leaving an absorber into a static mixing zone wherein supplemental washing water is added to recover absorbent chemicals. Improvements to the prior art methods are provided where one or more absorbent chemical recovery units are included to increase the amount of recovered absorbent chemicals exiting the regenerator and/or exiting the absorber are increased and/or maximized. Absorbent chemical recovery units can include mixing units where liquid is added to the stream of sour gas and absorbent chemical to mix with and absorb the absorbent chemical from the stream.

23 Claims, 4 Drawing Sheets

3530
3602
3504
3550

(51) Int. Cl.

| | |
|---|---|
| ***C10L 3/10*** | (2006.01) |
| ***C10G 70/06*** | (2006.01) |
| ***C10G 21/12*** | (2006.01) |
| ***C10G 21/28*** | (2006.01) |
| ***C10K 1/00*** | (2006.01) |

(52) U.S. Cl.

CPC ............. *B01D 53/18* (2013.01); *C10G 21/12* (2013.01); *C10G 21/28* (2013.01); *C10G 70/06* (2013.01); *C10K 1/003* (2013.01); *C10L 3/103* (2013.01); *C10L 3/104* (2013.01); *B01D 2252/2041* (2013.01); *B01D 2252/20405* (2013.01); *B01D 2252/504* (2013.01); *C10G 2300/203* (2013.01); *C10G 2300/207* (2013.01); *C10G 2300/208* (2013.01); *C10L 3/101* (2013.01); *C10L 2290/541* (2013.01)

(56) References Cited

U.S. PATENT DOCUMENTS

| | | | |
|---|---|---|---|
| 4,035,166 | A | 7/1977 | Van Hecke |
| 4,036,932 | A | 7/1977 | Sibeud et al. |
| 4,079,117 | A | 3/1978 | Butwell |
| 4,080,424 | A | 3/1978 | Miller et al. |
| 4,093,701 | A | 6/1978 | Butwell |
| 4,112,051 | A | 9/1978 | Sartori et al. |
| 4,124,685 | A | 11/1978 | Tarhan et al. |
| 4,184,855 | A | 1/1980 | Butwell et al. |
| 4,198,387 | A | 4/1980 | Laslo et al. |
| 4,240,923 | A | 12/1980 | Sartori et al. |
| 4,336,233 | A | 6/1982 | Appl et al. |
| 4,483,834 | A | 11/1984 | Wood |
| 4,499,059 | A | 2/1985 | Jones et al. |
| 5,137,702 | A | 8/1992 | Yan |
| 5,189,221 | A | 2/1993 | Duranleau et al. |
| 5,993,608 | A | 11/1999 | Abry et al. |
| 6,495,117 | B1 | 12/2002 | Lynn |
| 7,102,049 | B2 | 9/2006 | Ding et al. |
| 7,645,433 | B2 | 1/2010 | Rhodes et al. |
| 7,901,487 | B2 | 3/2011 | Rochelle |
| 8,058,493 | B2 | 11/2011 | Stark et al. |
| 8,816,078 | B2 | 8/2014 | Rochelle et al. |
| 9,249,366 | B2 | 2/2016 | Stark et al. |
| 2014/0030178 | A1 | 1/2014 | Martin |
| 2015/0027310 | A1 | 1/2015 | Augustsson et al. |

FOREIGN PATENT DOCUMENTS

| | | |
|---|---|---|
| WO | 2007146610 | 12/2001 |
| WO | 2007146611 | 12/2007 |
| WO | WO2012070523 A1 | 5/2012 |
| WO | WO2014065477 A1 | 5/2014 |

OTHER PUBLICATIONS

Nathan Hatcher and Ralph Weiland. “Reliable design of sour water strippers. A stimulation model aims to raise confidence in the reliability of sour stripper design.” 2012.

Nathan Hatcher and Ralph Weiland. “Ammonia in TGU Quench and Amine Systems.” Mar. 2012.

* cited by examiner

METHOD AND APPARATUS FOR RECOVERING ABSORBING AGENTS IN ACID GAS TREATMENT

CROSS-REFERENCE TO RELATED APPLICATIONS

This is a non-provisional of U.S. provisional patent application Ser. No. 62/358,397, filed on Jul. 5, 2016, and also a non-provisional of U.S. provisional patent application Ser. No. 62/365,666, filed on Jul. 22, 2016. Priority of and to each of the specified applications is hereby claimed and each of the specified applications are incorporated herein by reference.

STATEMENT REGARDING FEDERALLY SPONSORED RESEARCH OR DEVELOPMENT

Not applicable

REFERENCE TO A "MICROFICHE APPENDIX"

Not applicable

BACKGROUND

Prior Art System

A prior art amine absorption/regeneration method and apparatus is schematically shown in FIG. 1. In this prior art system, an absorber 500 which is preferably in the form of a column of suitable height and provided with a mass transfer system 550 such as baffles, trays, packing, or other suitable internals, to effect reduced rate of flow and efficient contact of the down-flowing liquid with the up-flowing gas.

Within the absorber 500 is deposited the absorbing agent via line 710 at upper entrance 520. Preferably, the absorbing agent is continuously delivered to the absorber 500 while the gas to be treated is delivered to the lower part through line 540.

The stripped gas is taken off from the top of the absorber 500 at exit 530 through line 1530 while the absorbent chemical (along with the absorbed gases), is taken off from the bottom at exit 510 through line 610.

Fluidly connected to the absorber 500 is a regenerator 800 having suitable means 850 for effecting intimate contact of the down-flowing absorbent chemical carrying the absorbed "sour gas" (entering regenerator 800 at entrance 820 via line 620) with the up-flowing steam (which separates the sour gas from the downflowing absorbent agent in the regenerator 800 and which then exits regenerator 800 at upper exit 830 via line 1110).

The absorbent chemical, carrying the absorbed sour gas, is conducted through lines 610 and 620 to the top of the regenerator 800, by means of a pump 650 or through higher differential pressure in absorber 500 versus regenerator 800, and enters regenerator 800 via upper entrance 820. The absorbent chemical, carrying the absorbed sour gas, is heated when passing through heat exchanger 600 by the higher temperature regenerated absorbent chemical in line 630 which exited regenerator 800 via lower exit 810. In turn the regenerated absorbent chemical in line 630 is cooled when passing through heat exchanger 600 by the lower temperature absorbent chemical carrying the absorbed sour gas in lines 610 and 620.

In the bottom of the regenerator 800 is a heating means (e.g., reboiler/heat exchanger 900) which generates steam through boiling of water vapor from the absorbent chemical. The sour gas driven from the absorbent agent in the regenerator 800 by the temperature increase and stripping steam, and is taken off from the top of the regenerator 800 at upper exit 830 through line 1110, A pump 640 or series of pumps withdraws the regenerated absorbent chemical through line 630 from the bottom of the regenerator 800 (at bottom exit 810), and delivers the regenerated absorbent chemical to absorber 500 via lines 630, 640, and 710 to the top of absorber 500 (at entrance 520).

Preferably, the temperature of the regenerator 800 is higher than in the absorber 500. Thus it is desirable to heat the stream delivered to the regenerator 800 through lines 610 and 620 and to cool the stream delivered to the absorber 500 through lines 630, 640, and 710. This heating and cooling may be accomplished by any suitable form of heat exchanger 600 (and possible supplemental heat exchanger 700). The absorbent agent, carrying the absorbed sour gas, flowing in lines 610 and 620 from the bottom 510 of absorber 500 flows through heat exchanger 600 in one direction, while the stream of regenerated absorbent chemical in line 630 from the bottom 810 of the regenerator 800 passes through heat exchanger 600 in the opposite direction and continuing on to the upper part 520 of the absorber 500. Because the drop in temperature of the stream of the regenerated absorbent chemical stream flowing in lines 630 and 640 may not be enough, an additional cooling heat exchanger 700 may be provided to cause the temperature of this stream to drop even more from line 640 to line 710 before ultimately entering absorber 500 at entrance 520.

In carrying out the process, the sour gas to be treated in line 540 is delivered to and passes up through the absorber 500. The carbon dioxide, sulphur dioxide, hydrogen sulphide, and/or other sour gases are removed by the action of the absorbing stream (which entered absorber at entrance 520), and the stripped or "sweet gas" (with the sour gas now having been removed) passes out of absorber 500 via exit 530 and into line 1530.

The absorbing stream, now with the absorbed sour gas, exits the absorber 500 via exit 510 and into line 610, is pre-heated by passing through heat exchanger 600 and enters the regenerator 800 via entrance 820. Reboiler/heat exchanger 900 heats the interior 860 of regenerator 800 creating a counterflow condition within the interior 860 schematically indicated by arrows 865 and 867.

Within the interior 860 of regenerator 800, liquid water and absorbent chemical trickles down through to the bottom of regenerator 800, and during this process the previously absorbed sour gas is at least partially separated from the absorbent chemical. The now separated sour gas moves upwardly through the interior 860 (schematically indicated by arrow 865) and exits regenerator 800 at exit 830 and enters line 1110.

A further portion of the absorbed sour gas is removed by vaporizing from the heat generated by reboiler/heat exchanger 900 heats the interior 860 of regenerator 800 thereby boiling off more of the absorbed sour gas from the absorbing agent (e.g., $H_2S$ from liquid amines). This is because the sour gas has a lower boiling temperature compared to the absorbent chemical such as amines. The regenerated absorbent chemical (e.g., mostly liquid amines now that most $H_2S$ removed) at a relatively high temperature exits regenerator 800 via exit 810 through line 630 to be cooled in the heat exchanger 600, and possibly further cooled in cooling heat exchanger 700, and returned for reuse in the absorber 500.

The liquid in the regenerator 800 may be heated by reboiler/heat exchanger 900 to such temperature that a portion of the absorbent chemical (e.g., amines) is vaporized and leaves regenerator 800 via exit 830 entering line 1110. To recover portions of this vaporized absorbent chemical, the stream in line 1110 can be run through a condenser 1100 to partially condense out the relatively high boiling temperature absorbent chemical from the vaporized gas stream of sour gas and absorbent chemical (e.g., vaporized $H_2S$ and amines). Partial recovery via condensation of the absorbent chemical is accomplished because the absorbent chemical has the higher boiling point compared to the sour gases and therefore condenses first while the sour gases remain in vapor form (e.g., even though the entire gas stream of $H_2S$ and absorbent chemical, the $H_2S$ stays vaporized because of its relatively low boiling point while the absorbent chemical condenses). Condenser 1100 can be any conventionally available heat exchanger such as a counter flow heat exchanger. The now cooled sour gas stream and condensed fluid stream leave the condenser 1100 to line 1120 and enters a separator/knock-out drum 1000 where the vaporized sour gas portion exits the separator/knock-out drum 1000 via line 1010 and the condensed fluid stream exits via line 1020. The condensed fluid stream in line 1020 can then be directed back to the regenerator 800 via line 1020 to inlet 840.

The above process can be a continuous one.

One deficiency with the prior art system is that it fails to fully recover the absorbent chemicals leaving absorber 500 via line 1530 and/or leaving regenerator 800 via line 1110 causing the need to periodically resupply absorbent chemicals which can be expensive.

The following U.S. patents are incorporated herein by reference:

U.S. patent numbers for acid gas treatment: U.S. Pat. Nos. 1,783,901; 3,594,985; 4,036,932; 4,079,117; 4,080,424; 4,093,701; 4,112,051; 4,124,685; 4,184,855; 4,198,387; 4,240,923; 4,336,233; 4,483,834; 4,499,059; 5,189,221; 5,993,608; 6,495,117; 7,102,049; 7,645,433; 7,901,487; 8,058,493; and U.S. Pat. No. 8,816,078.

U.S. patent numbers for static mixing systems: U.S. Pat. Nos. 5,255,974; 5,620,252; 5,688,047; 5,851,067; 5,865,537; 6,419,386; 6,576,617; 6,599,008; 6,676,286; 7,325,970; 7,841,765; 8,684,593; and U.S. Pat. No. 8,753,006.

While certain novel features of this invention shown and described below are pointed out in the annexed claims, the invention is not intended to be limited to the details specified, since a person of ordinary skill in the relevant art will understand that various omissions, modifications, substitutions and changes in the forms and details of the device illustrated and in its operation may be made without departing in any way from the spirit of the present invention. No feature of the invention is critical or essential unless it is expressly stated as being "critical" or "essential."

BRIEF SUMMARY

The apparatus of the present invention solves the problems confronted in the art in a simple and straightforward manner. What is provided is a Method and Apparatus for Recovering Absorbing Agents in Acid Gas Treatment.

In various embodiments the method and apparatus removes acidic compounds such as $H_2S$ and $CO_2$ among others acidic species from the sour gas with minimum solvent/absorbent chemicals losses due to evaporation.

The method and apparatus 10 may be carried out in various types of apparatuses either intermittently or continuously. In one embodiment is provided a continuous process for acid gas removal comprising the following steps: (a) introducing into an absorption zone a mixture of process gas and acid gas comprising a process gas selected from the group consisting of: a hydrocarbon, a mixture of hydrocarbons, synthesis gas, and a mixture of nitrogen and hydrogen, and about 1 to about 99 percent by volume of an acid gas selected from the group consisting of: carbon dioxide, hydrogen sulfide, other sulfur containing gases, and mixtures of the acid gases, wherein percent by volume is based on the total volume of the mixture of process gas and acid gas introduced into the absorption zone; (b) counter-currently contacting in the absorption zone the mixture of process gas and acid gas referred to in step "a" with an absorbent chemical, and water, the absorbent chemical and water are in solution prior to contact and (c) removing the process gas overhead from the absorption zone; (d) removing the absorbent chemical and water solution with the acid gas absorbed therein from the bottom of the absorption zone; (e) introducing the solution from step "d" into a regeneration zone; (f) separating a mixture of acid gas, absorbent chemical, and water from the solution referred to in step "e", the separated absorbent chemical and water portion being in the form of vapor, and removing the separated mixture of acid gas, absorbent chemical, and water overhead from the regeneration zone; (g) introducing the separated mixture of acid gas, absorbent chemical, and water referred to in step "f" to a static mixing zone wherein supplemental washing water is added and intimately mixed with the separated mixture of acid gas, absorbent chemical, and water referred to in step "f", thereby creating a water washed separated mixture of acid gas, absorbent chemical, and water solution; (h) passing the water washed separated mixture of acid gas, absorbent chemical, and water solution of step "g" into a cooling zone wherein the temperature of the water washed separated mixture is reduced by about 2° C. to about 210° C.; (i) removing the balance of the solution referred to in step "f" from the bottom of the regeneration zone; (j) passing the solution from step "i" into a cooling zone wherein the temperature of the solution is reduced by about 2° C. to about 120° C.; and (k) recycling the solution of step "j" to the absorption zone.

In one embodiment, one or more absorbent chemical recovery units are added to a continuous process for treating acid gases.

In various embodiments improvements to the prior art methods are provided where one or more absorbent chemical recovery units are included to increase the amount of recovered absorbent chemicals exiting the regenerator and/or exiting the absorber are increased and/or maximized. In various embodiments the absorbent chemical recovery units can comprise mixing units where liquid is added to the stream of sour gas and absorbent chemical to mix with and absorb the absorbent chemical from the stream.

In various embodiments the absorbent chemicals can be an alkanolamine selected from the group consisting of monoethanolamine (MEA), diethanolamine (DEA), methyldiethanolamine (MDEA), and mixtures of MDEA with other chemicals including combinations with one or more other amines, piperazines, acids, alkaline salts or physical solvents.

In various embodiments the absorbent chemicals can be selected from the group consisting of ethanolamines, alkylamines, akanolamines, hindered amines, glycols, and combinations of these or other chemicals in liquid form.

The drawings constitute a part of this specification and include exemplary embodiments to the invention, which may be embodied in various forms.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION

Detailed descriptions of one or more preferred embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in any appropriate system, structure or manner.

Figure 1:
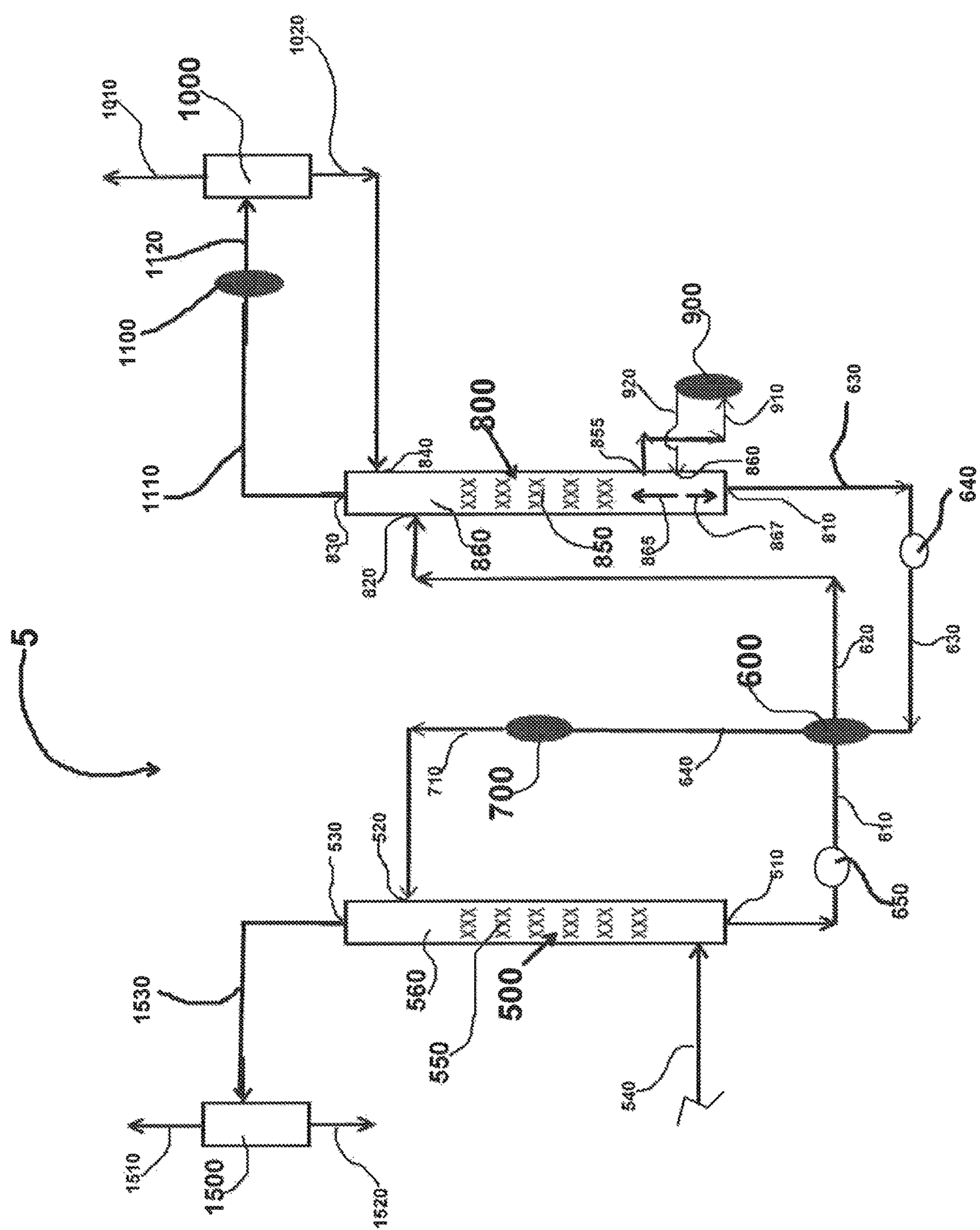
FIG. 1 is a schematic diagram showing a prior art continuous process for treating acid gases with an absorbent chemical/amine type solution.

FIG. 1 is a schematic diagram showing a prior art continuous process for treating acid gases with an absorbent amine type solution.

Figure 2:
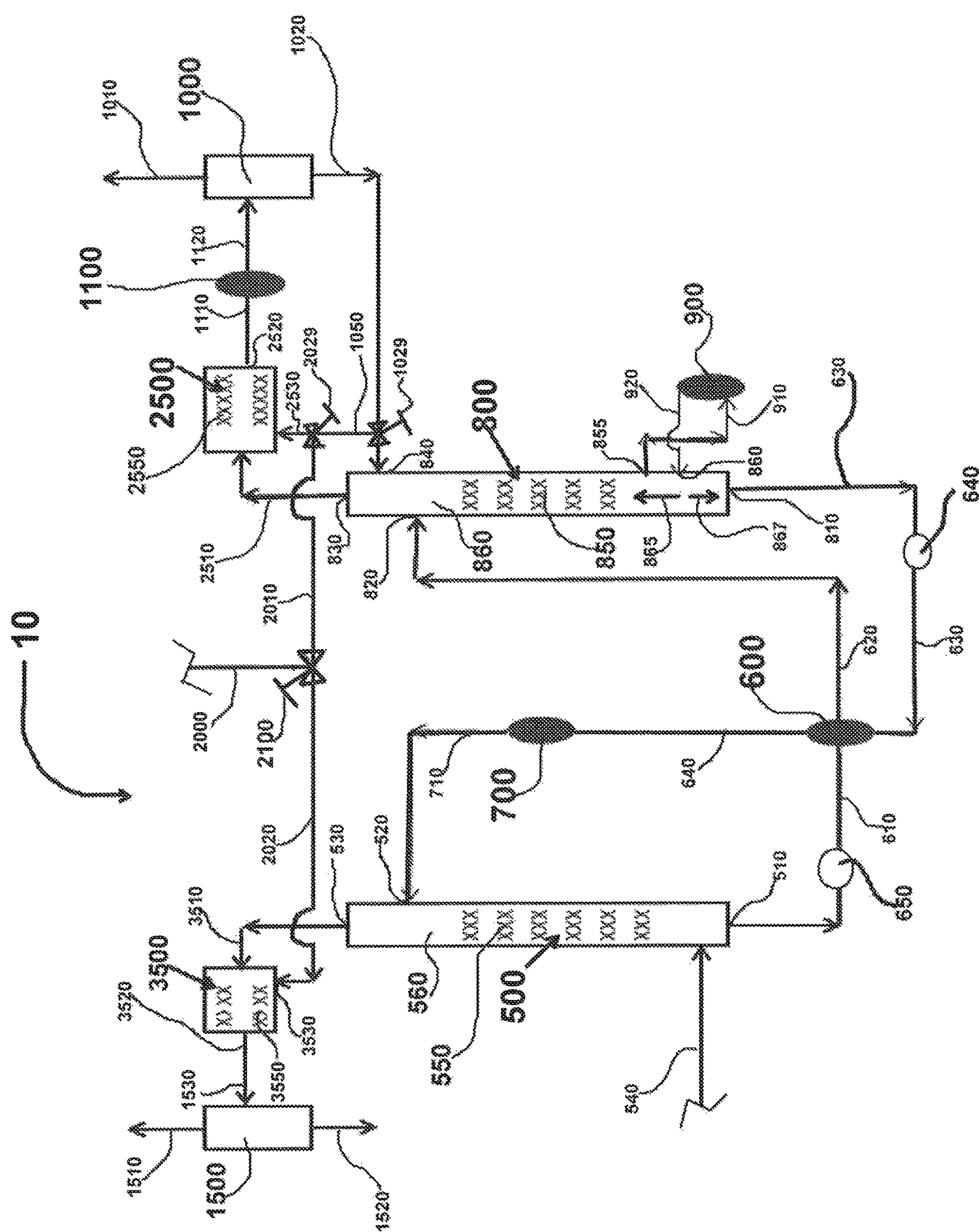
FIG. 2 is a schematic diagram showing one embodiment of an improved method and apparatus for continuously treating acid gases with an absorbent chemical type solution along with using one or two absorbent chemical recovery unit(s) for recovering lost absorbent chemicals.

FIG. 2 is a schematic diagram showing one embodiment of an improved method and apparatus 10 for continuously treating acid gases with an absorbent chemical type solution along with using absorbent chemical recovery unit(s) 2500 and 3500 for recovering lost absorbent chemicals. It is noted that either absorbent chemical recovery unit 3500 or absorbent chemical recovery unit 2500 can be omitted from the method and apparatus 10 but still in keeping with the intent of the invention for using an absorbent chemical recovery unit to recover absorbent chemical for reuse in the method and apparatus that would otherwise be lost.

Figure 3:
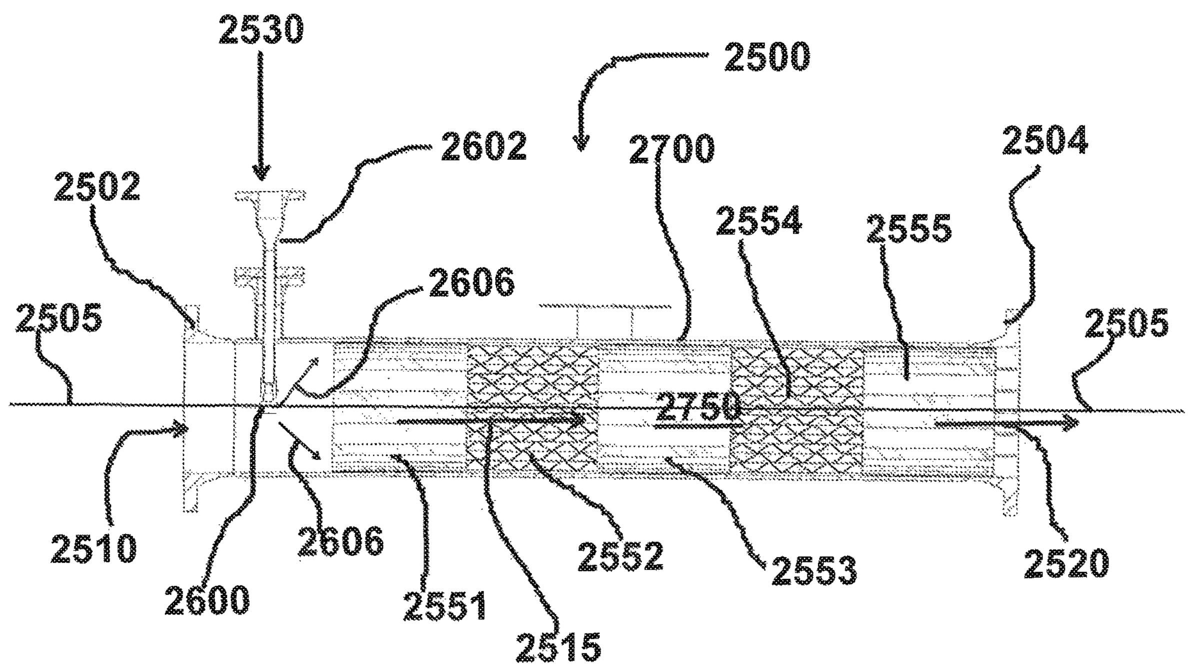
FIG. 3 shows a side sectional view of one embodiment of an absorbent chemical recovery unit fluidly connected to the regenerator of the method and apparatus.
Figure 4:
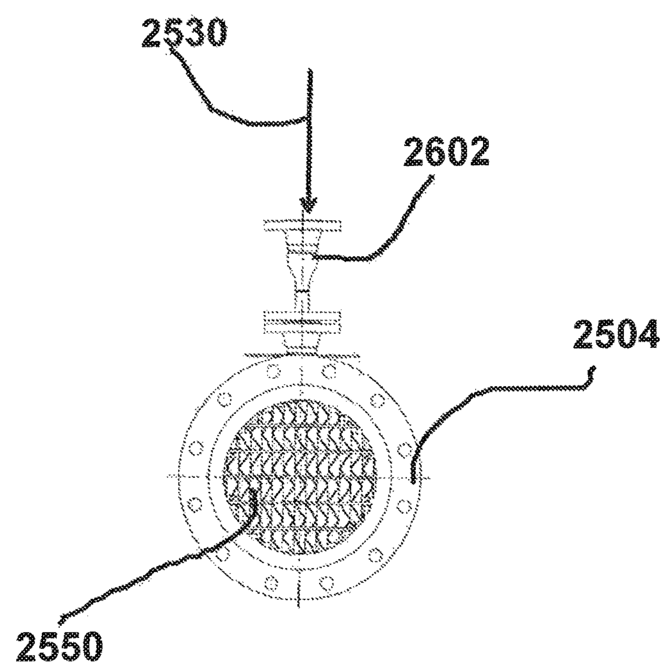
FIG. 4 is a front view of the absorbent chemical recovery unit of FIG. 3.

FIG. 3 shows a side sectional view of one embodiment of an absorbent chemical recovery unit 2500 fluidly connected to the regenerator 800 of the method and apparatus 10. FIG. 4 is a front view of the absorbent chemical recovery unit 2500.

Figure 5:
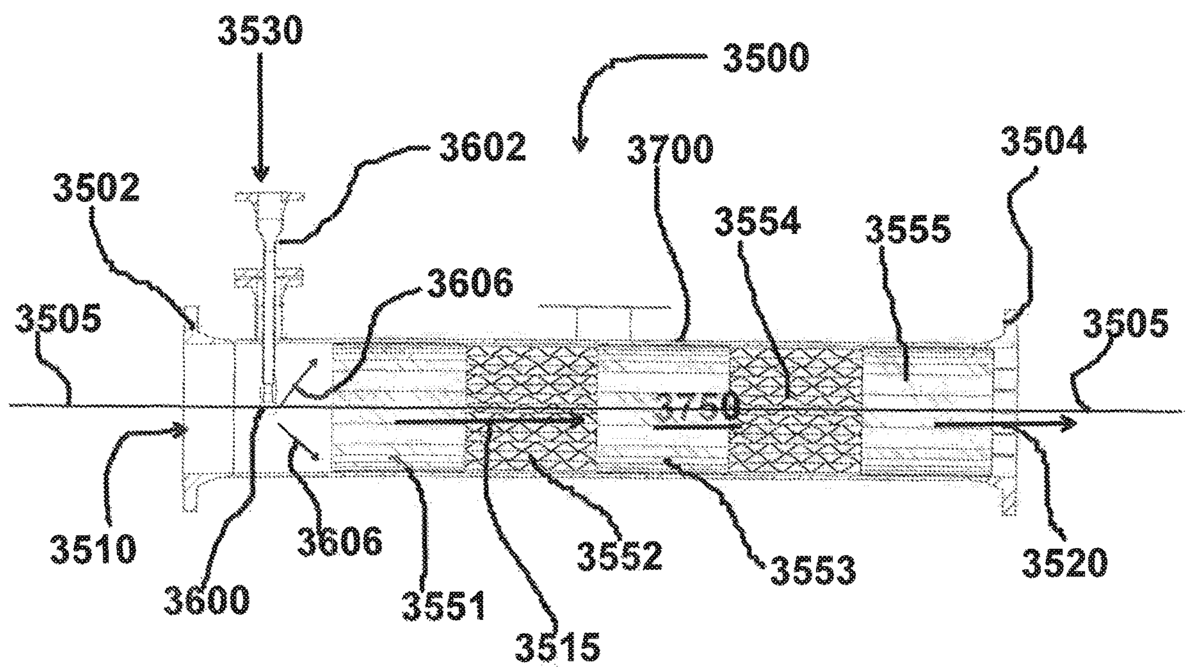
FIG. 5 shows a side sectional view of one embodiment of an absorbent chemical recovery unit fluidly connected to the absorber of the method and apparatus.
Figure 6:
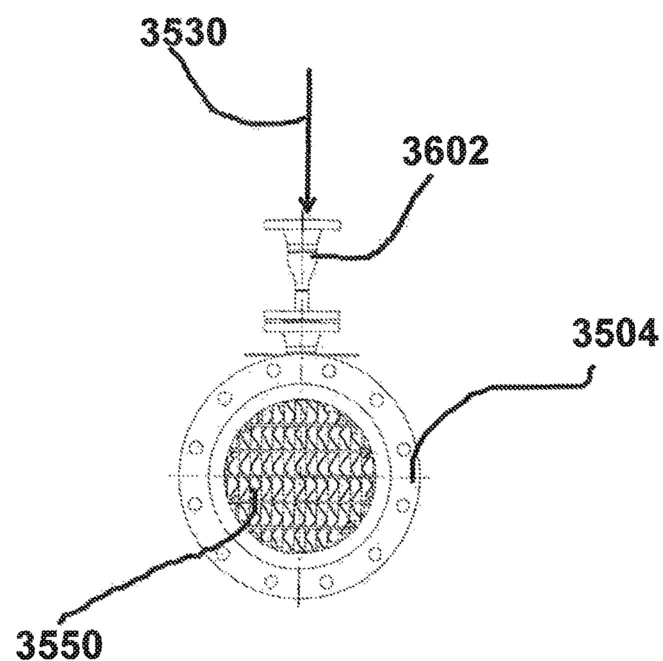
FIG. 6 is a front view of the absorbent chemical recovery unit of FIG. 5.

FIG. 5 shows a side sectional view of one embodiment of an absorbent chemical recovery unit 3500 fluidly connected to the absorber 500 of the method and apparatus 10. FIG. 6 is a front view of the absorbent chemical recovery unit 3500.

Treatment of Gas Coming Out of Absorber 500 with Absorbent Chemical Recovery Unit 3500

The sour gas 540 is treated by a counter flow water/absorbent chemical solution entering absorber 500 via line 710 at inlet 520 using mass transfer device 550 located in the interior 560 of absorber 500 causing absorbent chemical to absorb or remove acid gases from the gas stream.

The now treated "sweet gas" exiting the absorber 500 via line 3510 at exit 530 (containing the treated "sweet gas", some residual absorbent chemical, and water) is forwarded to an absorbent chemical recovery unit 3500. In the absorbent chemical recovery unit 3500, the treated stream of "sweet gas", residual absorbent chemical, and water will be washed and mixed with supplemental washing water which supplemental washing water enters the absorbent chemical recovery unit 3500 via inlet 3530 from line 2020.

The supplemental washing water in line 2020 can be obtained from one or both of the following water sources: (a) outside water source 2000 and/or (b) recovered water and absorbent chemicals from exit line 1020 which exited knockout drum 1000. From outside water source 2000, the flow path is outside water source 2000, through valve 2100, through line 2020, and into inlet 3530. From exit line 1020 coming out coming out of reflux drum 1000, the flow path is exit line 1020, through valve 1029, through line 1050, through valve 2029, through line 2010, through valve 2100, through line 2020 and into inlet 3530 of absorbent chemical recovery unit 3500. Based on operating conditions of the overall system, as will be described below, method and apparatus 10 can determine the amounts and/or relative of amounts of supplemental washing water to supply into absorbent chemical recovery unit 3500.

Inside absorbent chemical recovery unit 3500, the treated "sweet gas" coming out of absorber 500 via flow line 3510 can be intimately mixed with the supplemental washing water supplied to absorbent chemical recovery unit 3500 vial inlet 3530 to cause substantial amounts of absorbent chemicals originally in the gaseous phase to enter the liquid phase via intimate contact and mixing with the supplemental washing water supplied to absorbent chemical recovery unit 3500 via flow line 3530.

The now supplementary treated two phase flow coming out of absorbent chemical recovery unit 3500 via exit 3520 will be a combination of the treated "sweet gas" coming out of absorber 500 via flow line 3510 and water/absorbent chemicals. This flow will enter knock out drum 1500 via line 1530 wherein it will be separated/split into liquid and gas phases: (a) treated "sweet gas" which exits via line 1510 and (b) liquid phase containing additionally recovered absorbent chemicals and water which exits via line 1520.

"Sweet gas" leaving in line 1510 is the end product of the overall process method and apparatus 10, and can be sold and/or used for other processes.

Additionally recovered absorbent chemicals and water exiting knockout drum via line 1520 being mostly water but can also include small amounts of absorbent chemicals along with other constituents. These liquids can be stored for use as future absorbent chemicals and water make up, including but not limited to being routed through external water supply 2000, through line 610, and/or through line 1020 to regenerator 800, and/or used in other parts of method and apparatus 10.

Regeneration of Absorbent Chemical Solution Used to Treat Sour Gas in Absorber (500)

The method and apparatus 10 will take the absorbent chemical solution used to remove the "sour gas" in absorber 500, and leaving absorber 500 via exit 510, and separate this solution into (a) a sour gas part, and (b) an absorbent chemicals part. This separation will allow the absorbent chemicals to be reused for additional sour gas treatment in absorber 500, but also allow the sour gases to be properly handled such as being disposed of.

The absorbent chemical solution coming out from the bottom 510 of the absorber 500 is rich in sour/acid gases (removed from the treated sour gas entering absorber from line 540), then travels in line 610 to be preheated at the heat exchanger 600 via hot flow from line 630 (which hot flow comes from exit 810 of regenerator 800), and continues its travels in line 620 entering regenerator 800 via upper entrance 820. This rich in acid/sour gas/absorbent chemical solution will be regenerated or stripped of acid gases in the interior 860 of regenerator 800 using mass transfer 850.

In regenerator 800 a vapor counter flow stream (schematically indicated by arrow 865), including "sour gases" such as $H_2S$ and $CO_2$ among others acidic species and smaller and smaller amounts of gaseous absorbent chemicals is generated by the reboiler (900) via liquid exiting regenerator 800 at exit 850 and flowing in line 910 to reboiler 900, then becoming heated/exiting at line 920 and entering regenerator 800 via entrance 860, whereafter leaving regenerator 800 at upper exit 830, the acid/sour gases in line 2510 are lean in gaseous absorbent chemicals because the absorbent chemicals have a higher boiling point compared to the acid gases and do not boil off escape as much via gas in upper exit 830, but tend to sink to bottom of regenerator 800, and ultimately exiting at lower exit 810, and the absorbent chemicals that do leave regenerator 800 via upper exit 830 can be recovered in two stages:

(1) absorbent chemical recovery unit 2500, and (2) condenser unit 1100/reflux drum 1000.

The recovered absorbent chemicals and water leaving reflux drum 1000 via line 1020 can then be reused in the method and apparatus 10 at other points. For example, the recovered absorbent chemicals and water can be:

(a) partially injected into regenerator 800 at inlet 840 via line 1020; and/or (b) partially injected into absorbent chemical recovery unit 2500 via flow path valve 1029, line 1050, valve 2029, and line 2530; and/or (c) partially injected into absorbent chemical recovery unit 3500 via flow path valve 1029, line 1050, valve 2029, line 2010, valve 2100, line 2020, and inlet 3530.

The flow leaving the regenerator 800 via in line 630 at lower exit 810 is a mixture of hot absorbent chemicals, water, and some acid gases. The mixture in line 630 should be both: (a) rich in absorbent chemicals as these absorbent chemicals were regenerated from line 620 in regenerator 800 and (b) low in acid gases as the vast majority of acid gases left regenerator 800 via upper exit 830.

Absorbent Chemical Recovery Units 2500 and 3500

The acid gas, absorbent chemical, and water stream leaving the upper portion of regenerator 800 via upper exit 830 in line 2510 continue to absorbent chemical recovery unit 2500 where this stream is washed by supplemental washing water supplied by line 2530 and intimately mixed with said supplemental washing water. Intimate mixing can be achieved in absorbent chemical recovery unit 2500 via mass transfer device 2550 located inside unit 2500. Such intimate mixing with supplemental washing water tends to have the supplemental washing water absorb and recover the vast majority of absorbent chemical molecules coming from line 2510 in the vapor phase to the water in the liquid phase.

Referring to FIGS. 3 and 4, the static mixer 2500 comprises a tubular housing 2700 having first 2502 and second 2504 ends, interior 2750, and longitudinal axis 2505. Static mixer 3500 can be constructed substantially similar to static mixer 2500, and only static mixer 2500 will be described in detail.

Within interior 2750 can be a plurality of static mixing elements 2551, 2552, 2553, 2554, and 2555 which perform a mixing operation as flow moves through mixer 2500 interior 2750 from first end 2502 to second end 2504 (e.g., displacement in the direction of arrow 2515).

In one embodiment is provided a static mixer 2500 which includes a tubular housing 2700 with at mixing element 2550 disposed within the housing 2700. In various embodiments the tubular casing 2700 can be a circular section tube or a square section tube.

In various embodiments the mixing element 2550 can include a plurality of mixer element groups 2551, 2552, 2553, 2554, and/or 2555. In various embodiments the mixer element groups 2551, 2552, 2553, 2554, and/or 2555 are in different types of mixer groups. In one embodiment each mixer element group 2551, 2552, 2553, 2554, and/or 2555 includes a large number of webs arranged in a narrow "pack" to give a small "mesh size".

In one embodiment the mixer 2500 includes a tubular casing 2700 and, disposed therein, at least one mixer element 2550 in the form of crossed webs disposed at an angle with the longitudinal axis 2505, the webs being disposed in at least two groups, the webs of any one group of elements extending substantially parallel to one another, and the webs of one group crossing the webs of the other group.

A first flow stream can enter mixer 2500 via first end 2502 and moves generally in the direction of arrow 2510.

A second flow stream can enter mixer 2500 via inlet 2602 and be sprayed into interior 2750 via spray nozzle 2600. Second flow stream being sprayed out of nozzle is schematically shown by arrows 2606.

The first and second flow streams can be mixed in mixer 2500 as both streams move generally through mixer 2500 toward second end 2504.

As first and second flow streams move through mixer 2500 they pass through mixing elements 2551, 2552, 2553, 2554, and/or 2555. To facilitate mixing of first and second flow streams, as these flow streams pass through each static mixing element, the flow streams have their flow direction of flow diverted in numerous times as flow moves through mixer 2500 interior 2750 from first end 2502 to second end 2504 (e.g., displacement in the direction of arrow 2515). Additionally, the mixing elements have numerous surface areas which allow liquids to cover increasing the surface area of the liquid and thereby allowing this increased surface area to absorb and interact with other flow traversing through the mixing element.

In various embodiments mixing elements 2551, 2552, 2553, and/or 2554 can be arranged consecutively in tube 2700 and the adjacent elements (e.g., 2551, 2552, 2553, 2554, and/or 2555; and/or 2553/2554) are rotationally offset from each other about longitudinal axis 2505. In various embodiments rotational offset about the longitudinal axis 2505 can be 5, 10, 15, 20, 25, 30, 35, 40, 45, 50, 55, 60, 65, 70, 75, 80, 85, and/or 90 degrees. In various embodiments the rotational offset can fall within a range of between any two of the above referenced amounts of rotational offset (e.g., between 10 and 90 degrees or between 30 and 45 degrees).

The supplemental washing water in line 2530 can be obtained from one or both of the following water sources: (a) outside water source 2000 and (b) recovered water and absorbent chemicals from exit line 1020 which exited knockout drum 1000. From outside water source 2000, the flow path is outside water source 2000, through valve 2100, through line 2010, and into inlet 2530. From exit line 1020 coming out coming out of reflux drum 1000, the flow path is exit line 1020, through valve 1029, through line 1050, through valve 2029, and into inlet 2530 of absorbent chemical recovery unit 2500. Based on operating conditions of the overall system, as will be described below, method and apparatus 10 can determine the amounts and/or relative of amounts of supplemental washing water to supply into absorbent chemical recovery unit 2500.

A stream of liquid phase with recovered absorbent chemicals and gases exits absorbent chemical recovery unit 2500 via exit 2520, via line 1110 and enters heat exchanger/condenser 1100 where the stream is cooled down to condense additional liquid from the vapor phase, and the condensed stream exits heat exchanger 1100 via line 1120 and enters reflux drum 1000. In reflux drum 1000 the vapor and liquid phases are separated, with vapor phase being mainly water vapor and acid/sour gases exiting via line 1010, and with the liquid phase being mainly water and absorbent chemicals exiting via line 1020.

The absorbent chemicals and water mixture exiting from the reflux drum 1000 via line 1020 can be used in various other portions of the method and apparatus 10 which include one or more of the following options:

(a) injected into regenerator 800 via upper inlet 840 from valve 1029;

(b) to wash the gases coming out of regenerator 800 by injecting some or all of this stream into absorbent chemical recovery unit 2500 via line 1020, valve 1029, line 1050, valve 2029, and line 2530; and (c) to wash the gases coming out of absorber 500 by injecting some or all of this stream into absorbent chemical recovery unit 3500 via line 1020, valve 1029, line 1050, valve 2029, line 2010, valve 2100, line 2020, and into inlet 3530.

The mixing/washing in absorbent chemical recovery units 2500 and/or 3500 has been described above.

Absorbent Chemical Recovery Units 2500 and 3500

Absorbent chemical recovery units 2500 and 3500 are responsible for washing out the absorbent chemical molecules respectively found in lines 2510 and 3510 from the vapor phase of these streams to their liquid phases, in order to minimizing the amount of absorbent chemical losses for the method and apparatus 10 from evaporation (i.e., exiting respectively via lines 1010 and 1510) between the range of between 80 to 99.9%.

In various embodiments, when foaming and corrosion absorbent chemical usage has to be controlled in a plant by controlling hydrocarbon contamination or absorbent chemical degradation products as well as operating variables, the vaporization losses (of absorbent chemicals) are the main reason to add replacement absorbent chemical to the process. This replacement absorbent chemical is called "Solvent Make Up". Solvent Make Up for Natural Gas Industry could be in the range of between 1 to 3 pounds (0.373 to 1.119 kiligrams) of absorbent chemical for every Million Standard Cubic Feet (MMSCF) (28.32 Million Liters) of gas processed in the process. Typical Solvent Make Up can be up to 50% or more for the lighter components of the solvent needed to be made up (as the lighter tend to evaporate faster and in larger quantities).

Method and Apparatus Using Valves to Control Liquid Flows

The method and apparatus 10 controls operations of the components: absorber 500, heat exchanger 600, heat exchanger 700, regenerator 800, heat exchanger 900, knock-out drum 1000, heat exchanger 1100, knock out drum 1500, absorbent chemical recovery unit 2500, and absorbent chemical recovery unit 3500.

The method and apparatus 10 uses valves 1029, 2029, and 2100 to control flow rates, including relative flow rates, between the flow lines fluidly connected to the specific valves.

Based on operating conditions for regenerator 800, the method and apparatus 10 determines the amount of liquid flow required in line 840

Based on operating conditions for absorbent chemical recovery unit 2500, the method and apparatus 10 determines the amount of liquid flow required in line 2530 for absorbent chemical recovery unit 2500. Preferentially, method and apparatus 10 controls the amount of liquid flow in line 2530 relative to the amount of gaseous flow in line 2510 where absorbent chemical recovery unit 2500 will be operated with an L/V ratio falling within the range of between 0.5-2 GPM/MMSCF (0.06683-0.267334 liters per minute/million liters of gas) (Water/Gas) where GPM means gallons per minute; and MMSCF means Million Standard Cubic Feet of Gas.

The method and apparatus 10 controls valves 2100, 2029, and/or 2029 to cause absorbent chemical recovery unit 2500 to be operated withing an L/V ratio range of between 0.5-2 GPM/MMSCF (Water/Gas).

Based on operating conditions for absorbent chemical recovery unit 3500, the method and apparatus 10 determines the amount of liquid flow required in line 2020 for absorbent chemical recovery unit 3500. Preferentially, method and apparatus 10 controls the amount of liquid flow in line 2020 relative to the amount of gaseous flow in line 3510 where absorbent chemical recovery unit 3500 will be operated with an L/V ratio falling within the range of between 0.1-1.5 GPM/MMSCF (0.0134-0.205 liters per minute/million liters of gas) (Water/Gas). The method and apparatus 10 controls valves 2100, 2029, and/or 2029 to cause absorbent chemical recovery unit-3500 to be operated withing an L/V ratio range of between 0.1-1.5 GPM/MMSCF (Water/Gas).

Where the method and apparatus 10 determines that there is an excess of fluid flow in line 1020 compared to the required fluid flow in line 840 for operating regenerator 800, the method and apparatus can route a portion of said excess flow to absorbent chemical recovery unit 2500 and/or absorbent chemical recovery unit 3500.

If the method and apparatus 10 determines that said excess flow rate in line 1020 is greater than the cumulative required flow rates in both line 2530 for absorbent chemical recovery unit 2500 and line 2020 for absorbent chemical recovery unit 3500, then the method and apparatus can control valves 1029, 2029, and 2100 to divert a portion of said excess flow rate in line 1020 and also relatively split said diverted portions to both line 2530 for absorbent chemical recovery unit 2500 and line 2020 for absorbent chemical recovery unit 3500. For example, method and apparatus 10 can control valve 1029 to cause 30-50% flow from line 1020 to enter line 840 for the purpose of controlling absorbent chemical concentration in the water circuit to below 1% by weight. In a preferred embodiment only a portion of the excess flow rate is diverted from line 1020 to absorbent chemical recovery unit 2500 and/or absorbent chemical Absorbent chemical recovery unit 3500 even where the amount of flow entering line 840 is greater than the required amount of flow for line 840 determined by the method and apparatus.

If the method and apparatus 10 determines that said excess flow rate in line 1020 is less than the cumulative of the required flow rates in both line 2530 for absorbent chemical recovery unit 2500 and line 2020 for absorbent chemical recovery unit 3500, then the method and apparatus 10 can control valves 1029, 2029, and 2100 to divert a portion of said excess flow rate in line 1020 to absorbent chemical recovery unit 2500 and/or absorbent chemical recovery unit 3500.

If the method and apparatus 10 determines that said excess flow rate in line 1020 is less than both the required flow rate in both line 2530 for absorbent chemical recovery unit 2500 and line 2020 for absorbent chemical recovery unit 3500, then the method and apparatus 10 can control valves 1029, 2029, and 2100 to divert a portion of said excess flow rate in line 1020 to either absorbent chemical recovery unit 2500 or absorbent chemical recovery unit 3500. Preferentially, method and apparatus 10 will divert the excess flow rate in this case to absorbent chemical recovery unit 2500 by controlling valves 1029 and 2029 to satisfy the required flow rate into line 2530 of absorbent chemical recovery unit 2500. Also in this case method and apparatus 10 will control valve 2100 to utilize external water supply 2000 to satisfy any required flow rate in line 2020 to absorbent chemical recovery unit 3500.

In an alternative embodiment, if method and apparatus 10 determines that said excess flow rate in line 1020 is less than both the required flow rate in both line 2530 for absorbent chemical recovery unit 2500 and line 2020 for absorbent chemical recovery unit 3500, then the method and apparatus 10 can control valves 1029, 2029, and 2100 to divert a portion of said excess flow rate in line 1020 to either absorbent chemical recovery unit 2500 or absorbent chemical recovery unit 3500. In this alternative embodiment, method and apparatus 10 will divert the excess flow rate to absorbent chemical recovery unit 3500 by controlling valves 1029, 2029, and 2100 to satisfy the required flow rate into line 2020 of absorbent chemical recovery unit 3500. Also in this alternative case, method and apparatus 10 will control valves 2100 and 2029 to utilize external water supply 2000 to satisfy any required flow rate in line 2530 to absorbent chemical recovery unit 2500.

Where method and apparatus 10 determines that there is not an excess of fluid flow in line 1020 compared to the required fluid flow in line 840 for operating regenerator 800, method and apparatus 10 will control valves 2100 and 2029 to utilize external water supply 2000 to satisfy any required flow rates in line 2530 to absorbent chemical recovery unit 2500 and/or line 2020 to absorbent chemical recovery unit 3500.

Presently Available Equipment

Water wash devices currently exist and when present are located in the interiors of the absorber 500 in interior 560 and/or regenerator 800 in interior 860 using mass transfer devices 550 and 850, but in many circumstances these mass transfer devices 550 and 850 fail to recover significant portions of the absorbent chemicals in the "sweet gas" from line 3510 and the acid gases from line 2510, especially the lighter component of the absorbent chemical formulation.

With the use of absorbent chemical recovery unit 2500 and/or absorbent chemical recovery unit 3500 placed externally of the absorber 500 and/or regenerator 800, the recovery from lines 2510 and 3510 of substantially all absorbent chemical components of the absorbent chemical mixture is possible up to 99.9%. Moreover the light component recovery is also in the range of 90% to 99.9% depending on the operation variables.

Installing two different types of mass transfer devices, for two different services inside the interiors columns for absorber 500 (interior 560) and regenerator 800 (interior 860) is not preferred as such interior installations create more complex design and add to the costs of construction—requiring in the absorber 500 separation panels to avoid mixing the two liquid continues phases.

absorbent chemical recovery unit 2500 (between lines 2510 and 1110) and/or absorbent chemical recovery unit 3500 (between lines 3510 and 3520) are each able to recover absorbent chemical from the gaseous phase flows into these units within the following operating limits:

| | | ARU-3500 | ARU-2500 |
|---|---|---|---|
| (1)L/V Ratio | | | |
| (Expressed liters per minute/million liters of gas) | | 0.0134-0.205 | 0.0668-0.267 |
| (Expressed in GPM Liquid Flow/Gas Flow in MMSCFD) | | 0.1-1.5 | 0.5-2 |
| (2)Operating Pressure | (kilopascals) | 13.8-8274 | 34.5-206.7 |
| | (psi) | 2-1200 | 5-30 |
| (3)Temperature | (° C.) | 10-65.6 | 93.3-115.6 |
| | (° F.) | 50-150 | 200-240 |
| (4)Pressure Drop across the device | (kilopascals) | 6.9-34.5 | 6.9-34.5 |
| | (psi) | 1-5 | 1-5 |
| (5)Theoretical stages of mass transfer | | 0.5-1.5 | 0.5-1.5 |
| (6)The equipment's mass transfer devices (preferred) | | Work co-current | Work co-current |

Under conditions (1) through (5), were absorbent chemical recovery units 2500 and 3500 to be installed in the interiors of absorber 500 (interior 560); and/or regenerator 800 (interior 860), such interior installations will lead to the disadvantageous conditions of:

(1) spray regime operation** if trays are used, or (2) liquid channeling and or poor wettability due to very low LN ratio if packing is used, and in both cases leading to unappropriated mass transfer application, and lower absorbent chemical recovery.

** Spray regime operation in the distillation industry is defined as values below 50 gallons per minute of Liquid/Linear Ft of weir of the tray.

Efficiency across absorbent chemical recovery units 2500 and 3500 can be described by the following formula:

$$E=(X_1-X_o)/(X_{1*}-X_o)$$

where:

E=Efficiency $X_o$=Concentration of the component to be recovered from the gas to the liquid phase at inlet $X_1$=Concentration of the component to be recovered from the gas to the liquid phase at exit $X_{1*}$=Concentration of the component to be recovered from the gas to the liquid phase at exit equilibrium.

Because absorbent chemicals are 100% soluble in water even at high temperatures and the absorbent chemical concentration in the reflux drums 1000 and 1500 is controlled to maximum 1-2% w (percent by weight), then the efficiency of these units 2500 and 3500 can be over 99.9% at any given time if the proper mass transfer 2550 and 3550 is provided with the equipment. In various embodiments the efficiency can be about 80, 81, 82, 83, 84, 85, 86, 87, 88, 89, 90, 91, 92, 93, 94, 95, 96, 97, 98, 99, 99.1, 99.2, 99.3, 99.4, 99.5, 99.6, 99.7, 99.8, and/or 99.9 percent. In various embodiments the efficiency can fall within a range of between any two of the above referenced efficiency percentages.

Mass Transfer is dependent on the type of mass transfer and the surface area between the two phases. This allows the highest mass and heat transfer rates to be achieved.

Droplets are created by the application of turbulent shear, simultaneously, droplets are coalesced by collision with neighboring droplets as well as with the plate surfaces of the mixing elements. Film flow exists on the mixing element plates. A large interfacial area, a combination of mist and film, is created and continuously renewed. The droplet size distribution can be very narrow. The net result is high mass and heat transfer.

In various embodiments the operating pressure of the static mixing zone in absorbent chemical recovery unit 2500 is between 5 and 30 pounds per square inch. In various embodiments the operating pressure is at least 5, 6, 7, 8, 9, 10, 11, 12, 13, 14, 15, 16, 17, 18, 19, 20, 21, 22, 23, 24, 25, 26, 27, 28, 29, and 30 pounds per square inch (34.5, 41.4, 48.3, 55.2, 62.1, 69.0, 78.8, 82.7, 89.6, 96.5, 103.4, 110.3, 117.2, 124.1, 131.0, 137.9, 144.8, 151.7, 158.6, 165.5, 172.4, 179.3, 186.2, 193.1, 200.0, and 206.7 kilopascals). In various embodiments the operating pressure can fall within a range of between any two of the above referenced operating pressures.

In various embodiments the static mixing zone operating pressure in absorbent chemical recovery unit 3500 is between 2 and 1,200 pounds per square inch. In various embodiments the operating pressure is at least 2, 5, 10, 20, 30, 40, 50, 60, 70, 80, 90, 100, 200, 300, 400, 500, 600, 700, 800, 900, 1,000, 1,100, and 1,200 pounds per square inch (13.8, 34.5, 69.0, 137.9, 206.9, 275.8, 344.8, 413.7, 482.7, 551.6, 620.6, 689.5, 1379, 2069, 2758, 3448, 4137, 4827, 5516, 6206, 6895, 7585, and 8274 kilopascals). In various embodiments the operating pressure can fall within a range of between any two of the above referenced operating pressures.

In various embodiments the pressure drop across the static mixing zone in absorbent chemical recovery unit 2500 and/or absorbent chemical recovery unit 3500 is between 1 and 5 pounds per square inch (6.9 and 34.5 kilopascals). In various embodiments the pressure drop is less than 1, 2, 3, 4, and 5 pounds per square inch (6.9, 13.8, 20.7, 27.6, and 34.5 kilopascals). In various embodiments the pressure drop can fall within a range of between any two of the above referenced pressure drops.

In various embodiments the temperature of the static mixing zone in absorbent chemical recovery unit 2500 is between 200° F. and 240° F. (93.3 and 115.6° C.). In various embodiments the temperature is at least 200, 205, 210, 215, 220, 225, 230, 235, and 240° F. (93.3, 96.1, 98.9, 101.7, 104.4, 107.2, 110, 112.8, and 115.6° C.). In various embodiments the temperature can fall within a range of between any two of the above referenced temperatures.

In various embodiments the temperature of the static mixing zone in absorbent chemical recovery unit 3500 is between 50° F. and 150° F. (10 and 65.6° C.). In various embodiments the temperature is at least 50, 60, 70, 80, 90, 100, 110, 120, 130, 140, and 150° F. (10, 15.6, 21.1, 26.7, 32.2, 37.8, 43.3, 48.9, 54.4, 60, and 65.6° C.). In various embodiments the temperature can fall within a range of between any two of the above referenced temperatures.

In various embodiments the L/V Ratio of the static mixing zone in absorbent chemical recovery unit 2500 is between 0.5 and 2. In various embodiments the L/V Ratio is at least 0.5, 0.6, 0.7, 0.8, 0.9, 1, 1.2, 1.25, 1.3, 1.33, 1.4, 1.5, 1.6, 1.67, 1.7, 1.75, 1.8, 1.9, and 2. In various embodiments the L/V Ratio can fall within a range of between any two of the above referenced L/V Ratios.

In various embodiments the L/V Ratio of the static mixing zone in absorbent chemical recovery unit 3500 is between 0.1 and 1.5. In various embodiments the L/V Ratio is at least 0.1, 0.2, 0.3, 0.5, 0.6, 0.7, 0.8, 0.9, 1, 1.2, 1.25, 1.3, 1.33, 1.4, and 1.5. In various embodiments the L/V Ratio can fall within a range of between any two of the above referenced L/V Ratios.

In various embodiments the stages of mass transfer across the static mixing zone in absorbent chemical recovery unit 2500 and/or absorbent chemical recovery unit 3500 is between 0.5 and 1.5. In various embodiments the stages of mass transfer is at least 0.5, 0.6, 0.7, 0.8, 0.9, 1, 1.2, 1.25, 1.3, 1.33, 1.4, and 1.5. In various embodiments the stages of mass transfer can fall within a range of between any two of the above referenced stages of mass transfer.

The following is a list of reference numerals:

LIST FOR REFERENCE NUMERALS

| (Reference No.) | (Description) |
|---|---|
| 10 | method and apparatus |
| 500 | absorber |
| 510 | bottom of absorber |
| 520 | counter flow amine water solution |
| 530 | gas containing the treated gas, amine and water |
| 540 | sour gas |
| 550 | using mass transfer device |
| 560 | interior |
| 600 | heat exchanger |
| 610 | line |
| 620 | line |
| 630 | line |
| 640 | pump |
| 650 | pump |
| 700 | heat exchanger |
| 710 | line |
| 800 | regeneration/stripper section |
| 810 | lower exit of regenerator |
| 820 | upper entrance for sour gas, amine, and water |
| 830 | upper exit |
| 840 | upper return inlet |
| 855 | exit |
| 860 | interior of regenerator |
| 850 | mass transfer |
| 860 | entrance |
| 865 | arrow |
| 867 | arrow |
| 900 | reboiler/heat exchanger |
| 910 | line |
| 920 | line |
| 1000 | reflux drum |
| 1020 | line |
| 1029 | valve |
| 1050 | line |
| 1100 | heat exchanger/condenser unit |
| 1110 | line |
| 1120 | line |
| 1500 | knock out drum |
| 1510 | line |
| 1520 | line |

-continued

| LIST FOR REFERENCE NUMERALS | |
|---|---|
| (Reference No.) | (Description) |
| 2000 | external water supply |
| 2010 | line |
| 2020 | line |
| 2029 | valve |
| 2100 | valve |
| 2500 | absorbent chemical recovery unit |
| 2502 | first end |
| 2504 | second end |
| 2505 | longitudinal axis |
| 2510 | line |
| 2520 | exit |
| 2530 | line |
| 2550 | mass transfer |
| 2551 | first section |
| 2552 | second section |
| 2553 | third section |
| 2554 | fourth section |
| 2555 | fifth section |
| 2600 | spray nozzle |
| 2602 | inlet for nozzle |
| 2606 | spray |
| 2700 | tubular housing |
| 2750 | interior |
| 3500 | absorbent chemical recovery unit |
| 3502 | first end |
| 3504 | second end |
| 3505 | longitudinal axis |
| 3510 | line |
| 3520 | treated "sweet gas" two phase flow (treated gas, water and small amounts of absorbent chemicals) |
| 3530 | inlet |
| 3550 | mass transfer |
| 3551 | first section |
| 3552 | second section |
| 3553 | third section |
| 3554 | fourth section |
| 3555 | fifth section |
| 3600 | spray nozzle |
| 3602 | inlet for nozzle |
| 3606 | spray |
| 3700 | tubular housing |
| 3750 | interior |

All measurements disclosed herein are at standard temperature and pressure, at sea level on Earth, unless indicated otherwise. All materials used or intended to be used in a human being are biocompatible, unless indicated otherwise.

It will be understood that each of the elements described above, or two or more together may also find a useful application in other types of methods differing from the type described above. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention set forth in the appended claims. The foregoing embodiments are presented by way of example only; the scope of the present invention is to be limited only by the following claims.

The invention claimed is:

1. A continuous process for acid gas removal comprising the following steps:

(a) introducing into an absorber having an absorber interior and an absorption zone located in the absorber interior a mixture of process gas and acid gas comprising a process gas selected from the group consisting of:

a hydrocarbon, a mixture of hydrocarbons, synthesis gas, and a mixture of nitrogen and hydrogen, and about 1 to about 99 percent by volume of an acid gas selected from the group consisting of:

carbon dioxide, hydrogen sulfide, other sulfur containing gases, and mixtures of the acid gases, wherein percent by volume is based on the total volume of the mixture of process gas and acid gas introduced into the absorption zone;

(b) counter-currently contacting in the absorption zone the mixture of process gas and acid gas referred to in step "a"

with an absorbent chemical, and water, the absorbent chemical and water are in solution prior to contact and (c) removing the process gas overhead from the absorption zone;

(d) removing the absorbent chemical and water solution with the acid gas absorbed therein from the bottom of the absorption zone;

(e) introducing the solution from step "d"

into a regenerator having a regeneration interior and a regeneration zone located in the regeneration interior;

(f) separating a mixture of acid gas, absorbent chemical, and water from the solution referred to in step "e", the separated absorbent chemical and water portion being in the form of vapor, and removing the separated mixture of acid gas, absorbent chemical, and water overhead from the regeneration zone;

(g) introducing the separated mixture of acid gas, absorbent chemical, and water referred to in step "f"

to a static mixing zone not located in the absorber interior, wherein the static mixing zone includes a static mixing device having a tubular casing with a longitudinal axis and at least one mixing element in the form of crossed webs disposed at an angle with the longitudinal axis, the webs being disposed in at least two groups, the webs of any one group of elements extending substantially parallel to one another and the webs of one group crossing the webs of the other group, wherein supplemental washing water is added and intimately mixed with the separated mixture of acid gas, absorbent chemical, and water referred to in step "f", thereby creating a water washed separated mixture of acid gas, absorbent chemical, and water solution, and wherein the separated mixture of acid gas, absorbent chemical, and water solution and the supplemental washing water have co-current flows;

(h) passing the water washed separated mixture of acid gas, absorbent chemical, and water solution of step "g" into a cooling zone wherein the temperature of the water washed separated mixture is reduced;

(i) removing the balance of the solution referred to in step "f"

from the bottom of the regeneration zone;

(j) passing the solution from step "i" into a cooling zone wherein the temperature of the solution is reduced; and (k) recycling the solution of step "j" to the absorption zone.

2. The method of claim 1, wherein in step (a), the mixture of process gas and acid gas comprises a hydrocarbon or mixture of hydrocarbons.

3. The method of claim 1, wherein in step "a", the absorbent chemical is an alkanolamine is selected from the group consisting of monoethanolamine (MEA), diethanolamine (DEA), methyldiethanolamine (MDEA), and mixtures of MDEA with other chemicals comprising combinations with one or more other amines, piperazines, acids, alkaline salts or physical solvents.

4. The method of claim 1, wherein in step "a", the mixture of process gas and acid gas is saturated with water vapor.

5. The method of claim 1, wherein the static mixing device includes at least two mixer elements arranged consecutively in the tube and the adjacent elements are rotationally offset from each other above the longitudinal axis of the tube.

6. The method of claim 5, wherein the rotational offset about the longitudinal axis is ninety degrees.

7. The method of claim 1, wherein in step "g" the operating pressure of the static mixing zone is between 34.5 and 206.7 kilopascals (5 and 30 pounds per square inch).

8. The method of claim 1, wherein in step "g" the pressure drop across the static mixing zone is between 6.9 and 34.5 kilopascals (1 and 5 pounds per square inch).

9. The method of claim 1, wherein in step "g" the temperature of the static mixing zone is between 93.3° C. and 115° C. (200° F. and 240° F.).

10. The method of claim 1, wherein in step "g" the static mixing zone has an L/V Ratio of between 0.5 and 2.

11. The method of claim 1, wherein in step "g" the efficiency of the static mixing zone is at least 80 percent.

12. The method of claim 1, wherein in step "g" the efficiency of the static mixing zone is at least 95 percent.

13. The method of claim 1, wherein in step "g" the efficiency of the static mixing zone is at least 99 percent.

14. The method of claim 1, wherein in step "h" the temperature of the water washed separated mixture is reduced by a range of between about 2° C. to about 210° C.; and in step "j" the temperature of the solution is reduced by a range of between about 2° C. to about 210° C.

15. The method of claim 1, wherein the process gas removed overhead from the absorption zone of step "c" has absorbent chemicals and further comprising the step of introducing the process gas removed overhead from the absorption zone of step "c" into a second static mixing zone not located in the absorber interior wherein supplemental washing water is added and intimately mixed with the process gas removed overhead from the absorption zone step "c", thereby creating a water washed mixture of process gas, absorbent chemical, and water solution.

16. The method of claim 15, wherein the operating pressure of the second static mixing zone is between 13.8 and 8,274 kilopascals (2 and 1,200 pounds per square inch).

17. The method of claim 15, wherein the pressure drop across the second static mixing zone is between 6.9 and 34.5 kilopascals (1 and 5 pounds per square inch).

18. The method of claim 15, wherein the temperature of the second static mixing zone is between 10° C. and 65.6° C. (50° F. and 150° F.).

19. The method of claim 15, the second static mixing zone has an L/V Ratio of between 0.1 and 1.5.

20. The method of claim 15, wherein the efficiency of the second static mixing zone is at least 95 percent.

21. The method of claim 15, wherein the efficiency of the second static mixing zone is at least 90 percent.

22. The method of claim 15, wherein the efficiency of the second static mixing zone is at least 99 percent.

23. The method of claim 15, wherein the process gas moved overhead from the absorption zone and the supplemental washing water have co-current flows.

* * * * *